US008082168B1

(12) United States Patent
Judy

(10) Patent No.: US 8,082,168 B1
(45) Date of Patent: Dec. 20, 2011

(54) METHOD FOR STATISTICAL COMPARISON OF OCCUPATIONS BY SKILL SETS AND OTHER RELEVANT ATTRIBUTES

(76) Inventor: Richard W. Judy, Indianhapolis, IN (US)

( * ) Notice: Subject to any disclaimer, the term of this patent is extended or adjusted under 35 U.S.C. 154(b) by 326 days.

(21) Appl. No.: 12/318,374

(22) Filed: Dec. 29, 2008

Related U.S. Application Data

(60) Provisional application No. 61/006,196, filed on Dec. 28, 2007.

(51) Int. Cl.
G06Q 10/00 (2006.01)
(52) U.S. Cl. .................. 705/7.14; 705/7.17; 705/320
(58) Field of Classification Search ............... 705/7.14, 705/7.16–7.17, 320
See application file for complete search history.

(56) References Cited

U.S. PATENT DOCUMENTS

| 5,416,694 | A  | * | 5/1995  | Parrish et al. ............... 705/7.14 |
| 7,310,626 | B2 | * | 12/2007 | Scarborough et al. ......... 706/60 |
| 7,480,659 | B2 | * | 1/2009  | Chmura et al. ..................... 1/1 |
| 7,593,860 | B2 | * | 9/2009  | Mitchell ..................... 705/7.29 |
| 7,805,382 | B2 | * | 9/2010  | Rosen et al. .................. 705/321 |
| 2002/0046199 | A1 | * | 4/2002 | Scarborough et al. ......... 706/21 |
| 2002/0055867 | A1 | * | 5/2002 | Putnam et al. .................... 705/8 |
| 2002/0055870 | A1 | * | 5/2002 | Thomas ........................ 705/10 |
| 2002/0077884 | A1 | * | 6/2002 | Sketch ........................... 705/12 |
| 2003/0177027 | A1 | * | 9/2003 | DiMarco ........................... 705/1 |
| 2003/0182178 | A1 | * | 9/2003 | D'Elena et al. ................. 705/11 |
| 2004/0236598 | A1 | * | 11/2004 | Thomsen ......................... 705/1 |
| 2005/0044026 | A1 | * | 2/2005 | Leistner ........................ 705/35 |
| 2005/0267934 | A1 | * | 12/2005 | Brown et al. .................. 709/203 |
| 2005/0273350 | A1 | * | 12/2005 | Scarborough et al. ............ 705/1 |
| 2007/0059671 | A1 | * | 3/2007 | Mitchell ....................... 434/107 |
| 2007/0294125 | A1 | * | 12/2007 | Thomsen ....................... 705/10 |
| 2008/0027771 | A1 | * | 1/2008 | Steel ............................... 705/7 |
| 2008/0059523 | A1 | * | 3/2008 | Schmidt et al. ............ 707/104.1 |
| 2008/0065467 | A1 | * | 3/2008 | Nyegaard ....................... 705/10 |
| 2008/0086366 | A1 | * | 4/2008 | Concordia et al. .............. 705/11 |

OTHER PUBLICATIONS

Roberts, M., Matrix of Skills Transferability, Human Resources and Skills Development Canada, Matrix of Transferability (Jan. 2003), accessed at http://www.rhdcc-hrsdc.gc.ca/eng/cs/sp/hrsdc/lmp/publications/2003-002651/SP-587-04-04E.pdf.*
Roberts, M., Matrix of Skills Transferability, Human Resources and Skills Development Canada, Matrix of Transferability (Jan. 2003), accessed at http://www.rhdcc-hrsdc.gc.ca/eng/cs/sp/hrsdc/lmp/publications/2003-002651/SP-587-04-04E.pdf.*
Shaw, K. L., Occupational Change, Employer Change, and the Transferability of Skills, (Jan. 1987), Southern Economic Journal (53: 3). pp. 702-719.*

(Continued)

Primary Examiner — Beth V Boswell
Assistant Examiner — Tiphany Dickerson
(74) Attorney, Agent, or Firm — Edwards Wildman Palmer LLP

(57) ABSTRACT

A method and system for measuring transferability of workers between and among occupations by means of the mathematical relationships between those occupations' key attributes, as defined by publicly available data on the competencies required as specified by a complete catalog of U.S. occupations known as O*NET. This method provides a concise, informative measurement for comparing the relative requirements of abilities, skills, knowledge, and other relevant attributes of occupations, enabling users to gauge the feasibility of transferring workers from one occupation to another.

2 Claims, 3 Drawing Sheets

OTHER PUBLICATIONS

Judy, R.W., et al., Workforce 2020: Work and Workers in the 21st Century, (1997), Hudson Institute, 175 pp.*

Transferable Skill Analysis (2006), The Worksuite's On-line Service, accessed from: http://web.archive.org/web/20061120221228/http://www.theworksuite.com/resumes/id10.html.*

SkillTran Data Resources, (2005), webpage accessed at: www.skilltran.com/online/SkillTRAN_DataResources.pdf.*

Vertek Products (2005) accessed at: http://web.archive.org/web/20050327075119/http://www.vertekinc.com/VERTEKWEB.data/Articles/products.html.*

* cited by examiner

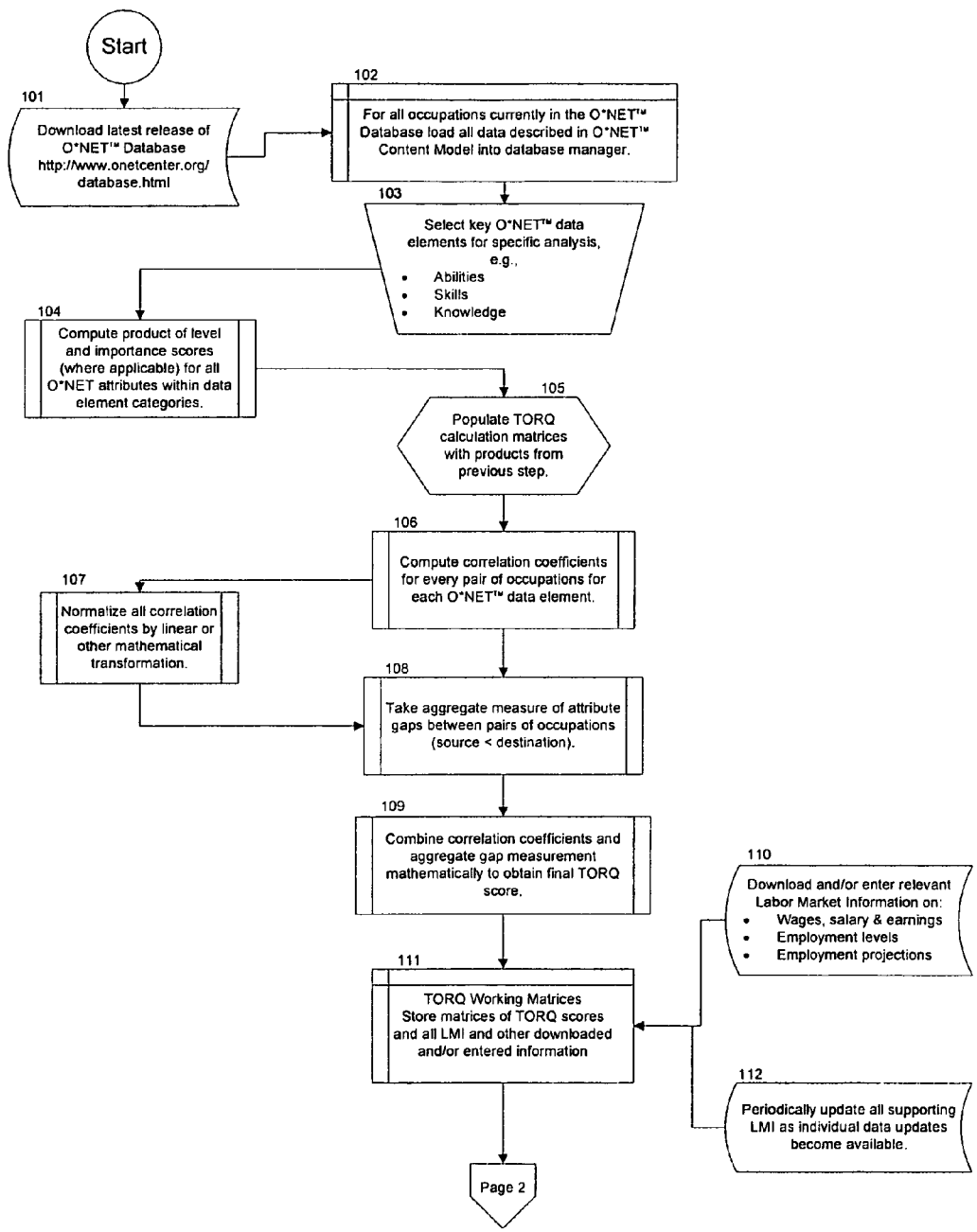
Figure 1. Computation and creation of the TORQ database

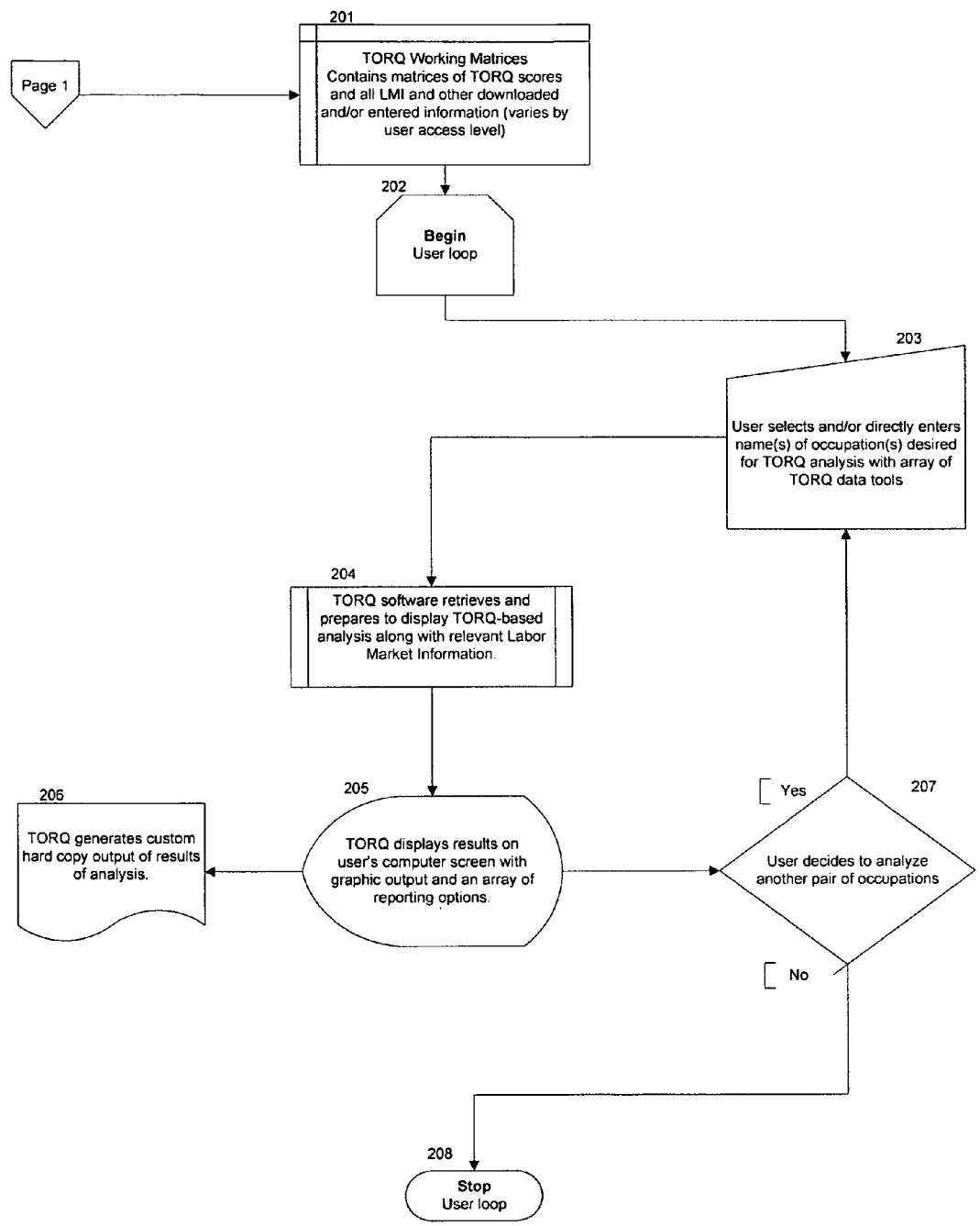
Figure 2. End User Retrieval of TORQ Database Information

Figure 3. Contents of the O*NET™ Database Used by TORQ

Contents of the O*NET™ Database Used by TORQ™

| Domains (301) | Descriptors (302) | Elements (303) | | | Data entries (304) | | | Notes re: O*NET12 (305) |
|---|---|---|---|---|---|---|---|---|
| | | 303a Major categories | 303b Minor categories | 303c Number | 304a Level | 304b Importance | 304c Data Value | |
| Worker Characteristics | Abilities | 4 | 14 | 53 | x | x | | 52 attributes with data in O*NET12 |
| | Occupational Interests | | | 6 | x | | | Separate field entries indicate the 1st, 2nd and 3rd highest of the six element names |
| | Work Values | 6 | | 21 | x | | | Major category values are averages (mean) of basic elements |
| | Work Styles | 6 | | 16 | | x | | |
| Worker Requirements | Basic Skills | 2 | | 10 | x | x | | |
| | Cross-Functional Skills | 5 | | 25 | x | x | | |
| | Knowledge | 8 | | 33 | x | x | | |
| | Education Level in Specific Subjects | | | 15 | | | | No data in O*NET12 |
| | Experience & Training | | | 4 | | | | Data for 3 in O*NET12 |
| | Basic-Skills Entry Requirements | 2 | | 10 | | | | No data in O*NET12 |
| | Cross-Functional Skills Entry Requirements | 5 | | 25 | | | | No data in O*NET12 |
| | Licenses, certificates, or registration | 2 | | 9 | | | | No data in O*NET12 |
| Experience Requirements | Education, Training & Experience | | | 12 | | | x | Data are in O*NET12 but not described in O*NET Content Model |
| Occupation-Specific Information | Tasks — Occupation-Specific Tasks List | | | 15,277 | | x | x | Of this total in O*NET12, 9,655 are "core," 4,967 are "Supplemental," and 605 are "n/a." |
| | Tools & Technology List | | | | | | | No data in O*NET12 |
| Workforce Characteristics | Labor Market Information | | | | | | | No data in O*NET12. Reference is to BLS |
| | Occupational Outlook | | | | | | | No data in O*NET12. Reference is to BLS |
| Occupational Requirements | Generalized Work Activities | 4 | 9 | 41 | | x | | |
| | Detailed Work Activities | | | | | | x | No data in O*NET12 |
| | Organizational Context | 2 | 32 | 66 | | | | No data in O*NET12 |
| | Work Context | 3 | 21 | 59 | Percentages of frequency and/or importance | | | 2 elements have no data in O*NET12 |

O*NET is a trademark of the
TORQ is a trademark of Workforce Associates, Inc.
Source: The O*NET® Content Model (http://www.onetcenter.org/content.html#cm2) and http://www.onetcenter.org/database.html#download

METHOD FOR STATISTICAL COMPARISON OF OCCUPATIONS BY SKILL SETS AND OTHER RELEVANT ATTRIBUTES This application claims priority on provisional patent application 61/006,196 filed on Dec. 28, 2007.

TECHNICAL FIELD

This invention is called TORQ—the Transferable Occupation Relationship Quotient. TORQ is a mathematical manipulation of Labor Market Information (LMI), making use of publicly available databases of key data about workers and occupations in the United States. It responds to a pervasive and continual need among economic developers, workforce development professionals, educators, and others for a useful way to assess the feasibility of transfer from one occupation to another. This invention's method for achieving this measure of "transferability" is based on mathematical relationships, including, but not limited to, statistical correlation of the skills, abilities, knowledge, and other attributes that are vital to each occupation.

BACKGROUND ART

Characterizing and comparing the vital attributes of occupations has been an important part of the field of LMI for many years. During the past decade, two major databases of occupational information have become the most widely known and used sources of occupation profiles and attribute comparison. Following are detailed descriptions of these two databases, which in turn are key information sources of TORQ, the invention described in this application. Additionally, several other systematic attempts have been made to approach the concept of occupational comparison and job transfer. The most significant of those efforts are described here.

O*NET

O*NET refers to the U.S. Department Of Labor's Occupational Information Network. O*NET's taxonomy of occupations is based on the occupation labels developed by the Bureau of Labor Statistics' Standard Occupational Classification (SOC) system.

As of late 2008, O*NET's database provides detailed data on 809 separate officially defined occupations. Each of these occupations is associated with a set of descriptors according to the O*NET Content Model, derived from detailed observation and analysis of job characteristics of each described occupation. O*NET's database is periodically reviewed and updated to include information on new and emerging occupations. The current version is O*NET 13.

The O*NET Content Model includes all six of the domains listed below, together with all of the descriptors there under which are associated with each of O*NET's listed occupations:

Worker Characteristics—enduring characteristics that may influence both work performance and the capacity to acquire knowledge and skills required for effective work performance.
  Abilities—Enduring attributes of the individual that influence performance.
  Occupational Interests—Preferences for work environments. Occupational Interest Profiles (OIPs) are compatible with Holland's (1985, 1997) model of personality types and work environments.
  Work Values—Global aspects of work composed of specific needs that are important to a person's satisfaction. Occupational Reinforcer Patterns (ORPs) are based on the Theory of Work Adjustment (Dawis & Lofquist, 1984).
  Work Styles—Personal characteristics that can affect how well someone performs a job.
Worker Requirements—descriptors referring to work-related attributes acquired and/or developed through experience and education.
  Basic Skills—Developed capacities that facilitate learning or the more rapid acquisition of knowledge
  Cross-Functional Skills—Developed capacities that facilitate performance of activities that occur across jobs.
  Knowledge—Organized sets of principles and facts applying in general domains.
  Education—Prior educational experience required to perform in a job.
Experience Requirements—requirements related to previous work activities and explicitly linked to certain types of work activities.
  Experience and Training—If someone were being hired to perform this job, how much of the following would be required?
  Basic Skills—Entry Requirement—Entry requirement for developed capacities that facilitate learning or the more rapid acquisition of knowledge.
  Cross-Functional Skills—Entry Requirement—Entry requirement for developed capacities that facilitate performance of activities that occur across jobs.
  Licensing—Licenses, certificates, or registrations that are awarded to show that a job holder has gained certain skills. This includes requirements for obtaining these credentials, and the organization or agency requiring their possession.
Occupation-Specific Information—variables or other Content Model elements of selected or specific occupations.
  Tasks—Occupation-Specific Tasks.
  Tools and Technology—Machines, equipment, tools, software, and information technology workers may use for optimal functioning in a high performance workplace.
Labor Market Characteristics—variables that define and describe the general characteristics of occupations that may influence occupational requirements.
  Labor Market Information—Information related to economic conditions and labor force characteristics of occupations.
  Occupational Outlook—Projections of future economic conditions and labor force characteristics of occupations.
Occupational Requirements—a comprehensive set of variables or detailed elements that describe what various occupations require.
  Generalized Work Activities—General types of job behaviors occurring on multiple jobs.
  Detailed Work Activities—Detailed types of job behaviors occurring on multiple jobs.
  Organizational Context—Characteristics of the organization that influence how people do their work.
  Work Context—Physical and social factors that influence the nature of work.

The information O*NET provides about each occupation is exhaustive and comprehensive. The multiple dimensions of occupational attributes cataloged by O*NET make the description of each occupation both extremely rich and highly complex. A table listing the major and minor components of the O*NET database and their hierarchical relationships is presented in FIG. 3.

Researchers attempting to make use of the O*NET database have been accordingly limited in their ability to embrace the entire set of data in several kinds of study involving career transfer and career paths. Most efforts to make productive use of the O*NET database have only encompassed one or a few dimensions of O*NET occupational data, or have merely repackaged O*NET data verbatim within various graphic and/or tabular displays or reports.

WORKKEYS

Another database of skills and abilities by occupation is provided by ACT, known as WORKKEYS. WORKKEYS provides a more concise set of groupings of skills and abilities—eight (8) groupings in all. Each of these categories—e.g. Applied Mathematics and Locating Information—is rated on a 0-7 scale. Like O*NET's occupational attributes, the information supplied by WORKKEYS is derived from a system of job profiling based on detailed observation and interviewing.

The major advantage of WORKKEYS is that it also features a worker assessment component, whereby individuals take tests to determine their personal skill levels in each of the crucial WORKKEYS dimensions. This component is highly useful to business recruiters and workforce and human resource professionals wishing to match individuals to job opportunities. The combination of career-to-career comparison and individual-to-career comparison has made WORKKEYS a preferred database for occupational information among the world of workforce development, despite the relative thinness of its occupational information compared to O*NET.

Transferable Skills and Gap Analysis

The concept of "transferable skills" has been the subject of a great deal of research and exploration among workforce and economic developers. From the workforce development standpoint, evaluating transferable skills has long been the concern of those tasked with finding new employment opportunities for displaced workers, whether individually or in the case of a mass layoff or plant closing. For economic developers, quickly assessing transferable skills present in a region's workforce is important to efforts to recruit and retain businesses.

Additionally, the interests of workforce development would be well served by a reliable method for assessing the skills present in a region's workforce. Much has been made lately of the importance of "skills gap analysis" as a tool for assessing the condition of local workforces, and preparing a region's workforce for $21^{st}$-century economy occupations. Most such efforts, however, have found that, while estimating shortages for individual occupations is relatively easy, given plentiful public employment information, it is much more difficult to assess the skills of an area's labor force in a similar way, absent an exhaustive community survey or other such expensive measures.

Career Ladders, Lattices, and Pathways

Related to the idea of skills transfer is the construction of networks that are variously known as career ladders, lattices, and/or pathways. These models of the interconnections between careers in similar fields or requiring similar skill/ability sets are designed for and used by guidance and employment counselors and human resources professionals to illustrate the possibilities offered by particular career and/or educational choices.

The various labels for these career maps imply different approaches to the network of career relationships. A career ladder indicates a more or less linear progression of education and experience in jobs of similar natures in the same or similar industries. A career lattice is a more inclusive set of occupations, based on relationships of skills, education levels, abilities, earnings, industries, and many other bases of comparison. A career path or pathway, then, describes any set of interconnected occupations within this larger career lattice.

It has historically been more difficult to construct a career lattice than a career ladder. The career path from a Certified Nursing Assistant to a Registered Nurse is relatively straightforward, but finding occupations with comparable attributes that might supply a need for skilled warehouse workers may be more difficult. Efforts to create career lattices based on observed O*NET or WORKKEYS attributes have been attempted, but none so far has taken a comprehensive view of these attributes with statistical rigor and precision that embraces the entire data set represented by either of these databases.

Competency Modeling

A close relative to the notion of career ladders and pathways is a product called a "competency model." A U.S. Department of Labor-sponsored project called the "Competency Model Clearinghouse" has produced such models based on the abilities, skills, and knowledge requirements of general employment in broad industry sectors and/or clusters, such as Information Technology, Advanced Manufacturing, and others.

These "competency models" consist of pyramidal representations of the varieties of abilities, skills, and knowledge that are required for any occupation within a given industry sector or cluster. The bottom level of the pyramid contains the most basic "employability" attributes like "interpersonal skills" and "initiative." Subsequent levels attain more and more specificity to the given industry, examining common knowledge bases required of all Information Technology professionals, for example. In the upper levels of these competency models, occupation-specific job requirements are quoted directly from O*NET.

These competency models do employ a systematic approach to their construction and definition, consisting of consultation with employers within the given industry for which the model has been constructed. This application, however, is by its nature more useful in a broader strategic sense than at the level of individual occupations. At the occupational level, competency models yield no more specific information than does raw O*NET data.

BRIEF DESCRIPTION OF THE DRAWINGS

FIG. 1 is a flowchart describing the process by which data are obtained and transformed to compute and store values for the Transferable Occupation Relationship Quotient;

FIG. 2 is a flowchart describing the process of end user interface to retrieve information derived from the Transferable Occupation Relationship Quotient; and FIG. 3 is a detailed table listing the various dimensions of the Department of Labor's O*NET occupational database used to calculate the Transferable Occupation Relationship Quotient.

DISCLOSURE OF THE INVENTION

TORQ begins with the statistical principle of correlation, i.e. "a single number that describes the degree of relationship between two variables." TORQ computations can be performed by means of a computer, software and a database where necessary.

Mathematically, a correlation is computed according to the following formula derived from the Web Center for Social Research Methods, where x and y are the two variables in question:

$$\mathrm{Correl}(X, Y) = \frac{\sum_i^{N^k} \{(x_i - \mu_x)(y_i - \mu_y)\}}{\left[\sqrt{\sum_i^{N^k}(x_i - \mu_x)^2 \sum_i^{N^k}(y_i - \mu_y)^2}\right]}$$

The ratio (Correl(X,Y)) produced by this formula is known as a correlation coefficient.

By applying this computation to the complete set of scores—that is, O*NET and WORKKEYS values for attribute levels and importance of skills, abilities, knowledge, and all other attributes relevant to any two given occupations within the database, the first building block of the TORQ computation is obtained. The multiple dimensions of attribute values in the O*NET and WORKKEYS database (for example; Skills, Abilities, and Knowledge in O*NET or Applied Mathematics and Locating Information in WORKKEYS) each produce their own individual correlation coefficient. The resultant values produced by the correlation algorithm are normalized to a scale of 0 to 100.

Once the correlation coefficients are computed, the process of TORQ calculation continues with an adjustment step which incorporates measures of the individual gaps between all of the composite level-importance scores of the abilities, skills, and knowledge attributes for the pair of occupations being analyzed for which those scores for the destination occupation exceeds those for the source occupation. This aggregate measure is then used to adjust the previously calculated correlation coefficients in order to provide a more precise indication of the relationship between occupations and to create an accurate representation of the asymmetry of transfer between occupations.

The adjusted TORQ scores still take values from 0 to 100. A zero value indicates no significant congruence or lack thereof between occupations' skills, abilities, and/or knowledge; and a value of 100 indicates total congruence. (Obviously, each occupation has a TORQ value of 100 relative to itself for all attributes.)

It should be noted that TORQ values are calculated for each significant category of occupational attributes being compared, i.e., for abilities, skills, knowledge, etc. There is also a combined measure known as a "Grand TORQ," which is obtained by taking a weighted average of all the TORQ values for all the individual attribute categories measured. "Weighted average" indicates that the calculation of the Grand TORQ can be adjusted to reflect the user's sense of priorities concerning the attributes of each pair of occupations, based on a combination of the correlation coefficients described above.

The full articulation of the mathematical process of calculating TORQ follows below.

DETAILED DESCRIPTION OF THE DRAWINGS

The following detailed account describes the procedural steps involved in calculating TORQ and user extraction of information from the TORQ database.

Computation and Creation of the TORQ Database (FIG. 1)

101. Acquire O*NET data for each occupation

The process begins with the acquisition of current occupational profile data from the Department of Labor's online O*NET database (or a comparable substitute should O*NET data become unavailable at some point).

102. Load complete set of O*NET data for each occupation into database

These data are then loaded into a database management program for further manipulation. The current database type for TORQ uses the Structured Query Language (SQL). Each occupation in this database is re-indexed according to a simple set of Occupation Numbers (OCCNOs).

103. Select attribute dimensions for entry into TORQ calculation matrices

Each occupational attribute dimension (e.g. Skills) is selected individually, and scores for both level and importance for each attribute within the given dimension (e.g. "Active Listening" within Skills) are entered. The current active attribute dimensions for TORQ calculation include Abilities, Skills, and Knowledge. Other attribute dimensions may be used to create TORQ calculation matrices as well, in like fashion.

104. Multiply level and importance scores for attributes in each dimension

Within each attribute dimension, a product of each attribute's importance and level scores is calculated, creating a composite measure of value for each attribute within the context of any given occupation.

105. Create the TORQ calculation matrices

In every attribute dimension (e.g. Skills) a separate calculation matrix is created, which consists of the composite attribute scores produced by the multiplication in step (4). Each matrix contains the complete set of these composite scores for every occupation in two dimensions, to allow direct comparison of any occupation with any other. Thus, the dimension of a given attribute matrix is n×m where n=the number of occupations in the current version of the O*NET database and m=number of individual attributes in the given attribute dimension.

106. Correlate scores across all pairs of occupations

Then, for every one of these calculation matrices, the correlation process F1 is applied to produce a correlation coefficient.

107. Normalize correlation coefficients

Each resulting correlation coefficient is then normalized to a 0 to 100 scale via a linear or other mathematical transformation. This resulting normalized coefficient is the first primary component of the Transferable Occupation Relationship Quotient (TORQ), but this alone does not comprise the final TORQ value.

108 and 109. Refine TORQ value through systematic evaluation of gaps

The adjustment of the final TORQ value incorporates measures of the individual gaps between all of the composite level-importance scores of the abilities, skills, and knowledge attributes for the pair of occupations being analyzed.

For each attribute dimension, the sum of the differences between the composite level-importance scores for the two occupations (for which those scores for the destination occupation exceeds those for the source occupation) is divided by the raw sum of the composite level-importance score of the destination occupation. This aggregate measure (i.e., the ratio produced as just described) is then used to adjust the previously calculated correlation coefficients. This adjustment makes the TORQ value more accurate and useful in at least two important ways:

First, it corrects the strictly correlation-based calculation by introducing a quantitative measure of the asymmetry between the transferability between members of pairs of occupations. In the usual case, the measure of the transferability (i.e., the TORQ) of a worker in occupation "A" to occupation "B" is not the same as the TORQ in the opposite direction, i.e., from "B" to "A." The transferability of a paralegal to become a lawyer, for example, is not the same as that of a lawyer transferring to become a paralegal. Taking account of the gaps in the occupational attributes as described above ensures that this asymmetry will be reflected in the TORQ values. (In other words, the TORQ value will not be the same for the paralegal→lawyer transition as it would for the lawyer→paralegal transition.)

Second, it accounts for the rare but problematic instances in which the composite level-importance scores of two occupations are highly correlated but where large and uniform gaps exist between the two sets of scores. In such cases, a high correlation coefficient taken by itself is a spurious indicator of the actual transferability of workers. If two occupations require similar ASKs (abilities, skills, and knowledge) but there exist consistently large gaps in the scores required between the two across the entire range of ASKs, then a mere correlation coefficient would look similar for these two occupations as it would for two which are genuinely closely related and present a real possibility for transfer. Adjusting the correlation coefficient by applying a measure of the attribute gaps between the two occupations' scores minimizes the possibility that the final TORQ will indicate a spurious degree of transferability.

110. Acquire and synchronize related labor market information by occupation

Separately, other labor market information (LMI) is downloaded and stored, and catalogued by the OCCNO of each occupation, to provide matches for each occupation in the TORQ database. This LMI set includes such indicators as prevailing median wages for occupations, estimates of current and projected future regional employment in each occupation, and other information at the national, state, and region-specific levels.

The scope and variety of LMI included in these datasets is determined partially by the set of end users making use of TORQ, and their geographic areas of interest. Currently TORQ uses LMI databases from the national Occupation and Employment Survey (OES) for detailed current information, and state and local information supplied by clients at those levels for purposes of maximum local relevance and the provision of employment projections for estimates of future occupational change.

111. Create TORQ master database

Once calculated, TORQ values for every available pair of occupations, along every comparable attribute set (e.g. Abilities, Skills, Knowledge, etc.), are stored in a complete database which also contains the catalogued accompanying LMI values for each OCCNO-listed occupation.

112. Update calculations and LMI

Periodically, updates are supplied to the data upon which TORQ relies for calculation of TORQ values itself—i.e. new editions of O*NET—and for the labor market information which accompanies the occupations in this database. These data sources are monitored regularly and used to refresh the TORQ database of occupational information whenever the source data are renewed. As of the filing of this patent application, TORQ uses values from O*NET version 12, pending US Department of Labor review of irregularities in these same values in the new O*NET version 13 released in 2008. Also, new state and sub-state-level clients supply current, local relevant labor market information to use with their own TORQ operations—supplied through the TORQ online user interface.

End User Retrieval of TORQ Database Information (FIG. 2)

201. End user interactive access

An end user accessing the TORQ database interacts with it through a front-end software application. This application currently takes the form of a Web-based interface, customized for use by different types of users, which can access TORQ database information over the Internet via a central server which stores and updates TORQ data.

202. Begin user loop

This begins the sequence of activity for any analytical exercise within the TORQ interactive system.

203. User actions querying TORQ database

This end user application allows the user to query the TORQ database for TORQ values based on pairs of occupations, and on analysis of the TORQ relationships between one occupation and a number of promising alternatives for transfer, via various major tools and sections of the online TORQ user interface. Users may also adjust the output from the database upon the basis of controls for the sensitivity of data to the user's specified criteria. Different types of users will have access to different sets of data controls, depending on the kinds of labor market information relevant to their interests. (A labor researcher, for example, may make use of a wider range of statistical sensitivity controls than a career counselor, and might make use of data tools more relevant to long-term strategic analysis than immediate tactical transfer options.)

204. TORQ system database query and report generation

After receiving instructions for data retrieval and sensitivity controls, the TORQ database produces a report of TORQ values and all specified LMI for the occupations and other data input by the end user.

205. Display results of query and LMI analysis

This report is displayed on the user's screen, in a format which can be printed, saved, etc. according to the user's preference.

206. User hard copy output generation

The user may choose to produce a hard copy of the output generated by the TORQ system, which may be done in a variety of ways.

207 and 208. Repeat analysis and user logoff

The querying and reporting process can be repeated for as many iterations and variations on analysis as the user prefers before ending the user loop.

Contents of the O*NET Database Used by TORQ (FIG. 3)

This figure describes the major portions of the O*NET spectrum of occupational information and their various subdivisions and data contents:

Domains (301): Describes the "domain" of occupational information to which various sets of attributes belong. (This corresponds with the O*NET list of domains cited above in the "Background Art" section.)

Descriptors (302): This lists the sets of major groupings of occupational attributes within each domain.

Elements (303): Descriptions of the various subdivisions of information within each "Descriptor" group. These include:

303a Major Categories—Number of major divisions of the "Descriptor" group.

303b Minor Categories—Number of subdivisions of the Major Categories.

303c Number—the total number of attributes listed within the "Descriptor" group.

Data Entries (304): Descriptions of the type of data reported by O*NET within each "descriptor" group. These include:

304a Level—An O*NET-defined "level" of each attribute measured for the occupation in question. (e.g. the level of night vision typical to a truck driver)

304b Importance—The O*NET-defined "importance" value assigned to each attribute to the occupation in question. (For example, night vision is not very important for an accountant.)

304c Data Value—A data value that exists on its own scale (independent of O*NET's ranking system). (For example, education levels are defined as High School Graduate, BA/BS Degree, etc.)

Notes re: O*NET 12 (305): Pertains to the status of each data component in the developing new release of the O*NET database, which will form the updated and expanded library of information for TORQ computation upon its release. (As previously noted, TORQ currently runs on O*NET 11.)

Articulation of Mathematical TORQ Calculation Process

The full process of mathematical computation of the Transferable Occupation Relationship Quotient is articulated below. This process provides the mathematical basis for component (105) of FIG. 1, the mathematical correlation process that feeds the initial TORQ computation flow chart.

Definitions of Symbols:

V denotes the sequential number of the most current version of the O*NET database. As explained before, TORQ currently uses O*NET12. Therefore the value of V is 12.

Symbols and Definitions for Occupations:

$O^v$ equals the number of occupations for which data are supplied in the $v^{th}$ version of the O*NET database. Circa late 2007, $O^v \equiv O^{12}$.

$O^{12} = 801$ $^{OCCNO}O^v$ denotes the occupation with "Occupation Number" (or OCCNO) in $O^v$ and. Its value goes from 1 to $O^v$.

For example, in O*NET12, the first occupation listed in the database (i.e., OCCNO=1) carries the SOC code of 11-1011.00 which corresponds to "Chief Executives." The last occupation listed in 0*NET12 (i.e., OCCNO=801) carries the SOC code of 53-7121.00 which corresponds to "Tank Car, Truck, and Ship Loaders."

Symbols and Definitions for Descriptors, Elements and Scores:

For every $^{OCCNO}O^v \exists D^v$, a set of O*NET descriptors (e.g., "abilities;" "skills;" "knowledge;") in the $v^{th}$ version of the O*NET database.

$^vM$ equals the number of O*NET descriptors (e.g., "abilities;" "skills;" "knowledge;") in the $v^{th}$ version of the O*NET database plus the number of CMDs computed as described below.

$^{12}M = 24$. A complete list of the 21 descriptors in O*NET12 is displayed in FIG. 3, plus three CMDs for Abilities, Skills and Knowledge.

For each descriptor $^dD^v \in D^v$, (d=1, 2, . . . , $^vM$), $\exists$ a set of elements which represent attributes of that descriptor. For example, for the descriptor called "Abilities" in O*NET12, there exist 53 elements (only 52 with data for scores) beginning with "Oral Comprehension" and continuing with "Written Comprehension," "Oral Expression" and so on for 50 more elements.

For each element in each descriptor, there exists one or more sets $S^k$ consisting of $N^k$ scores where $S^k \ni x_i$, (i=1, 2, . . . , $N^k$).

To illustrate, in O*NET12, for each of the descriptors for abilities, skills and knowledge there exist two sets of scores, one for "level" and the second for "importance."

And therefore, where:

OCCNO=1 which translates to "Chief Executives"

v=12;

d=abilities;

k=level i=1 meaning "Oral Comprehension"

So, we have $x_1 \in S^k$ equal to 4.92 which is the Level score for Oral Comprehension for Chief Executives in O*NET12.

Working with Matrices from O*NET in TORQ

Recall that for each element in each descriptor, there exists one or more sets $S^k$ consisting of $N^k$ scores where $S^k \ni x_j$, (j=1, 2, . . . , $N^k$). In most cases, there are two such sets for each descriptor (Level and Importance). The number of scores in the O*NET database is very large and TORQ builds two 801×801 matrices for each descriptor $S^k$ and for each type of data provided (e.g., Level, Importance, etc.). To illustrate, among the matrices from O*NET12, TORQ builds these:

For the Abilities descriptor alone, there are 52 Level scores and 52 Importance Scores. Each of these creates a matrix in the working database of dimension 801×52. Each of those contains 42,453 individual scores.

For Occupational Interests, there are 6 scores for Level which produces a matrix of dimension 801×6 containing 4,806 scores.

For Work Values, there are 21 scores for Level which gives a matrix of dimension 801×21 containing 16, 821 scores.

For Work Styles, there are 16 Importance scores which gives a matrix of dimension 801×16 containing 12,816 scores.

For Basic Skills, there are 10 scores each for Level and Importance which gives two matrices of dimension 801×10. Each of these contains 8,010 scores.

For Cross-Functional Skills, there are 25 scores each for Level and Importance which gives two matrices of dimension 801×25 containing 20,025 scores each.

For Knowledge, there are 33 scores each for Level and Importance which gives two matrices of dimension 801×33 containing 26,433 scores each.

For Abilities, Skills, and Knowledge, the scores for Level and Importance are multiplied to produce three synthetic descriptors called "Combined Multiplicative Descriptors" (or "CMDs") each of which has the same dimensions as the original descriptor.

Formula for Computing the Correlation Coefficients

For every descriptor or CMD, $^dD^v \in D^v$, let X and Y represent two vectors in a set, $S^k$, of scores for the $x^{th}$ and $y^{th}$ occupations where both x and y run from 1 to $O^v$ (which, for O*NET12 would be from 1 to 801). Then the Correlation Coefficient for that pair [abbreviated Correl(X,Y)] is computed in TORQ as follows:

$$\mathrm{Correl}(X, Y) = \frac{\sum_{i}^{N^k} \{(x_i - \mu_x)(y_i - \mu_y)\}}{\left[\sqrt{\sum_{i}^{N^k} (x_i - \mu_x)^2 \sum_{i}^{N^k} (y_i - \mu_y)^2}\right]}$$

Where:

$x_i \in X$ and $y_i \in Y$, $i=1 \ldots, N^k$ and $(j=1, 2, \ldots, N^k)$;

$$\mu_x = \frac{\sum_i^{N^k} \{x_i\}}{N^k}$$

(i.e., the mean value of the X vector) and $$\mu_{xy} = \frac{\sum_i^{N^k} \{y_i\}}{N^k}$$

(i.e., the mean value of the Y vector).

For each descriptor, $^dD^v \in D^v$, for which scores exist in the current version of the O*NET database (for Level, Importance, or other data value), TORQ computes correlation coefficients as just described for every pair of the $O^v$ occupations. These correlation coefficients may range in value from −1 to +1.

Normalization of the Correlation Coefficients

TORQ "normalizes" each correlation coefficient by multiplying it by 100 (or otherwise linearly transforming it). For each descriptor, therefore, the computation and this normalization produce a square matrix of correlation coefficients of dimension 801×801 that is symmetric around its diagonal axis.

For example, if a given user of TORQ based on ONET12 preferred to analyze only the descriptors of Abilities, Skills and Knowledge (rather than the entire gamut of O*NET descriptors) then there would be nine matrices of correlation coefficients, each of dimension of 801×801. They would be for the Level and Importance of the three descriptors selected for analysis plus an additional matrix of CMD correlation coefficients corresponding to the original three descriptors. Obviously, the number of matrices of correlation coefficients increases in proportion to the number of descriptors chosen for analysis.

Illustration of TORQ Calculation Based on Existing O*NET Occupational Attributes To illustrate the procedure described above, consider how the Abilities Importance correlation coefficient is computed for one pair of occupations, namely Cardiovascular Technologists and Technicians (SOC 29-2031.00) and Registered Nurses (29-1111.00).

Step 1: Download the latest O*NET database which, for the purposes of this illustration, is O*NET 12.0 Database and is to be found at http://www.onetcenter.org/database.html#download. Store these data in a local database editor and/or spreadsheet program.

Step 2: Retrieve the Abilities Importance Scores for both occupations.

Step 3: Standardize the original Data Value according to the following formula as provided by O*NET The level and importance scales each have a different range of possible scores. Ratings on Level were collected on a 0-7 scale, ratings on Importance were collected on a 1-5 scale, and ratings on Frequency were collected on a 1-4 scale. To make reports generated by O*NET OnLine more intuitively understandable to users, descriptor average ratings were standardized to a scale ranging from 0 to 100. The equation for conversion of original ratings to standardized scores is:

$S=((O-L)/(H-L))*100$ where S is the standardized score, O is the original rating score on one of the three scales, L is the lowest possible score on the rating scale used, and H is the highest possible score on the rating scale used. For example, an original Importance rating score of 3 is converted to a standardized score of 50 (50=[[3−1]/[5−1]]*100). For another example, an original Level rating score of 5 is converted to a standardized score of 71 (71=[[5−0]/[7−0]]*100).

In this case, $S=((\text{Original Data Value}-1)/4$. The original and standardized values are shown in the following table:

| | | | | | |
|---|---|---|---|---|---|
| 29-1111.00 | 1.A.1.a.1 | Oral Comprehension | IM | 4.25 | 81.3 |
| 29-1111.00 | 1.A.1.a.2 | Written Comprehension | IM | 3.88 | 72.0 |
| 29-1111.00 | 1.A.1.a.3 | Oral Expression | IM | 4.63 | 90.8 |
| 29-1111.00 | 1.A.1.a.4 | Written Expression | IM | 4 | 75.0 |
| 29-1111.00 | 1.A.1.b.1 | Fluency of Ideas | IM | 2.5 | 37.5 |
| 29-1111.00 | 1.A.1.b.2 | Originality | IM | 2.38 | 34.5 |
| 29-1111.00 | 1.A.1.b.3 | Problem Sensitivity | IM | 4.75 | 93.8 |
| 29-1111.00 | 1.A.1.b.4 | Deductive Reasoning | IM | 4 | 75.0 |
| 29-1111.00 | 1.A.1.b.5 | Inductive Reasoning | IM | 4.25 | 81.3 |
| 29-1111.00 | 1.A.1.b.6 | Information Ordering | IM | 3.5 | 62.5 |
| 29-1111.00 | 1.A.1.b.7 | Category Flexibility | IM | 3 | 50.0 |
| 29-1111.00 | 1.A.1.c.1 | Mathematical Reasoning | IM | 1.88 | 22.0 |
| 29-1111.00 | 1.A.1.c.2 | Number Facility | IM | 1.63 | 15.8 |
| 29-1111.00 | 1.A.1.d.1 | Memorization | IM | 2.63 | 40.8 |
| 29-1111.00 | 1.A.1.e.1 | Speed of Closure | IM | 3 | 50.0 |
| 29-1111.00 | 1.A.1.e.2 | Flexibility of Closure | IM | 3.25 | 56.3 |
| 29-1111.00 | 1.A.1.e.3 | Perceptual Speed | IM | 2.63 | 40.8 |
| 29-1111.00 | 1.A.1.f.1 | Spatial Orientation | IM | 1.38 | 9.5 |
| 29-1111.00 | 1.A.1.f.2 | Visualization | IM | 1.75 | 18.8 |
| 29-1111.00 | 1.A.1.g.1 | Selective Attention | IM | 3.5 | 62.5 |
| 29-1111.00 | 1.A.1.g.2 | Time Sharing | IM | 3.25 | 56.3 |
| 29-1111.00 | 1.A.2.a.1 | Arm-Hand Steadiness | IM | 3 | 50.0 |
| 29-1111.00 | 1.A.2.a.2 | Manual Dexterity | IM | 3.13 | 53.3 |
| 29-1111.00 | 1.A.2.a.3 | Finger Dexterity | IM | 2.38 | 34.5 |
| 29-1111.00 | 1.A.2.b.1 | Control Precision | IM | 2.25 | 31.3 |
| 29-1111.00 | 1.A.2.b.2 | Multilimb Coordination | IM | 2.25 | 31.3 |
| 29-1111.00 | 1.A 2.b.3 | Response Orientation | IM | 1.88 | 22.0 |
| 29-1111.00 | 1.A.2.b.4 | Rate Control | IM | 1.13 | 3.3 |
| 29-1111.00 | 1.A.2.c.1 | Reaction Time | IM | 2 | 25.0 |
| 29-1111.00 | 1.A.2.c.2 | Wrist-Finger Speed | IM | 1.25 | 6.3 |
| 29-1111.00 | 1.A.2.c.3 | Speed of Limb Movement | IM | 1.88 | 22.0 |
| 29-1111.00 | 1.A.3.a.1 | Static Strength | IM | 2.38 | 34.5 |
| 29-1111.00 | 1.A.3.a.2 | Explosive Strength | IM | 1.38 | 9.5 |
| 29-1111.00 | 1.A.3.a.3 | Dynamic Strength | IM | 1.75 | 18.8 |
| 29-1111.00 | 1.A.3.a.4 | Trunk Strength | IM | 3.38 | 59.5 |
| 29-1111.00 | 1.A.3.b.1 | Stamina | IM | 2.63 | 40.8 |
| 29-1111.00 | 1.A.3.c.1 | Extent Flexibility | IM | 2.75 | 43.8 |
| 29-1111.00 | 1.A.3.c.2 | Dynamic Flexibility | IM | 1.13 | 3.3 |
| 29-1111.00 | 1.A.3.c.3 | Gross Body Coordination | IM | 2.63 | 40.8 |
| 29-1111.00 | 1.A.3.c.4 | Gross Body Equilibrium | IM | 1.63 | 15.8 |
| 29-1111.00 | 1.A.4.a.1 | Near Vision | IM | 3.63 | 65.8 |
| 29-1111.00 | 1.A.4.a.2 | Far Vision | IM | 2.13 | 28.3 |
| 29-1111.00 | 1.A.4.a.3 | Visual Color Discrimination | IM | 2.13 | 28.3 |
| 29-1111.00 | 1.A.4.a.4 | Night Vision | IM | 1 | 0.0 |
| 29-1111.00 | 1.A.4.a.5 | Peripheral Vision | IM | 1 | 0.0 |
| 29-1111.00 | 1.A.4.a.6 | Depth Perception | IM | 2.13 | 28.3 |
| 29-1111.00 | 1.A.4.a.7 | Glare Sensitivity | IM | 1 | 0.0 |
| 29-1111.00 | 1.A.4.b.1 | Hearing Sensitivity | IM | 2 | 25.0 |
| 29-1111:00 | 1.A.4.b.2 | Auditory Attention | IM | 2.38 | 34.5 |
| 29-1111.00 | 1.A.4.b.3 | Sound Localization | IM | 1 | 0.0 |
| 29-1111.00 | 1.A.4.b.4 | Speech Recognition | IM | 4 | 75.0 |
| 29-1111.00 | 1.A.4.b.5 | Speech Clarity | IM | 4 | 75.0 |
| 29-2031.00 | 1.A.1.a.1 | Oral Comprehension | IM | 4 | 75.0 |
| 29-2031.00 | 1.A.1.a.2 | Written Comprehension | IM | 3.38 | 59.5 |
| 29-2031.00 | 1.A.1.a.3 | Oral Expression | IM | 3.88 | 72.0 |
| 29-2031.00 | 1.A.1.a.4 | Written Expression | IM | 3.25 | 56.3 |
| 29-2031.00 | 1.A.1.b.1 | Fluency of Ideas | IM | 2.88 | 47.0 |
| 29-2031.00 | 1.A.1.b.2 | Originality | IM | 3 | 50.0 |
| 29-2031.00 | 1.A.1.b.3 | Problem Sensitivity | IM | 4 | 75.0 |
| 29-2031.00 | 1.A.1.b.4 | Deductive Reasoning | IM | 3.63 | 65.8 |
| 29-2031.00 | 1.A.1.b.5 | Inductive Reasoning | IM | 3.63 | 65.8 |
| 29-2031.00 | 1.A.1.b.6 | Information Ordering | IM | 3.63 | 65.8 |
| 29-2031.00 | 1.A.1.b.7 | Category Flexibility | IM | 3.13 | 53.3 |
| 29-2031.00 | 1.A.1.c.1 | Mathematical Reasoning | IM | 2.63 | 40.8 |
| 29-2031.00 | 1.A.1.c.2 | Number Facility | IM | 2.63 | 40.8 |
| 29-2031.00 | 1.A.1.d.1 | Memorization | IM | 2.75 | 43.8 |
| 29-2031.00 | 1.A.1.e.1 | Speed of Closure | IM | 2.75 | 43.8 |
| 29-2031.00 | 1.A.1.e.2 | Flexibility of Closure | IM | 3.13 | 53.3 |

| | | | | | |
|---|---|---|---|---|---|
| 29-2031.00 | 1.A.1.e.3 | Perceptual Speed | IM | 3.5 | 62.5 |
| 29-2031.00 | 1.A.1.f.1 | Spatial Orientation | IM | 1.13 | 3.3 |
| 29-2031.00 | 1.A.1.f.2 | Visualization | IM | 2.88 | 47.0 |
| 29-2031.00 | 1.A.1.g.1 | Selective Attention | IM | 3.38 | 59.5 |
| 29-2031.00 | 1.A.1.g.2 | Time Sharing | IM | 3 | 50.0 |
| 29-2031.00 | 1.A.2.a.1 | Arm-Hand Steadiness | IM | 2.88 | 47.0 |
| 29-2031.00 | 1.A.2.a.2 | Manual Dexterity | IM | 2.63 | 40.8 |
| 29-2031.00 | 1.A.2.a.3 | Finger Dexterity | IM | 3 | 50.0 |
| 29-2031.00 | 1.A.2.b.1 | Control Precision | IM | 2.88 | 47.0 |
| 29-2031.00 | 1.A.2.b.2 | Multilimb Coordination | IM | 2.63 | 40.8 |
| 29-2031.00 | 1.A.2.b.3 | Response Orientation | IM | 2.38 | 34.5 |
| 29-2031.00 | 1.A.2.b.4 | Rate Control | IM | 1.88 | 22.0 |
| 29-2031.00 | 1.A.2.c.1 | Reaction Time | IM | 2.38 | 34.5 |
| 29-2031.00 | 1.A.2.c.2 | Wrist-Finger Speed | IM | 1.88 | 22.0 |
| 29-2031.00 | 1.A.2.c.3 | Speed of Limb Movement | IM | 2 | 25.0 |
| 29-2031.00 | 1.A.3.a.1 | Static Strength | IM | 2.38 | 34.5 |
| 29-2031.00 | 1.A.3.a.2 | Explosive Strength | IM | 1.13 | 3.3 |
| 29-2031.00 | 1.A.3.a.3 | Dynamic Strength | IM | 1.88 | 22.0 |
| 29-2031.00 | 1.A.3.a.4 | Trunk Strength | IM | 2.13 | 28.3 |
| 29-2031.00 | 1.A.3.b.1 | Stamina | IM | 2.25 | 31.3 |
| 29-2031.00 | 1.A.3.c.1 | Extent Flexibility | IM | 2.25 | 31.3 |
| 29-2031.00 | 1.A.3.c.2 | Dynamic Flexibility | IM | 1 | 0.0 |
| 29-2031.00 | 1.A.3.c.3 | Gross Body Coordination | IM | 2.25 | 31.3 |
| 29-2031.00 | 1.A.3.c.4 | Gross Body Equilibrium | IM | 2 | 25.0 |
| 29-2031.00 | 1.A.4.a.1 | Near Vision | IM | 3.88 | 72.0 |
| 29-2031.00 | 1.A.4.a.2 | Far Vision | IM | 2.88 | 47.0 |
| 29-2031.00 | 1.A.4.a.3 | Visual Color Discrimination | IM | 3 | 50.0 |
| 29-2031.00 | 1.A.4.a.4 | Night Vision | IM | 1.13 | 3.3 |
| 29-2031.00 | 1.A.4.a.5 | Peripheral Vision | IM | 1.13 | 3.3 |
| 29-2031.00 | 1.A.4.a.6 | Depth Perception | IM | 2.63 | 40.8 |
| 29-2031.00 | 1.A.4.a.7 | Glare Sensitivity | IM | 1 | 0.0 |
| 29-2031.00 | 1.A.4.b.1 | Hearing Sensitivity | IM | 2.88 | 47.0 |
| 29-2031.00 | 1.A.4.b.2 | Auditory Attention | IM | 2.63 | 40.8 |
| 29-2031.00 | 1.A.4.b.3 | Sound Localization | IM | 1.13 | 3.3 |
| 29-2031.00 | 1.A.4.b.4 | Speech Recognition | IM | 3.75 | 68.8 |
| 29-2031.00 | 1.A.4.b.5 | Speech Clarity | IM | 3.88 | 72.0 |

Step 4: Compute the mean values of the Standardized Values for each occupation and find their product.

Thus, taking as Standardized Values for Cardiovascular Technologists and Technicians (SOC 29-2031.00) as the X vector, we compute the mean value of the X vector $$\mu_x = \frac{\sum_i^{52} \{x_i\}}{52}$$

to be 46.4

And, taking Registered Nurses (SOC 29-1111.00) as the Y vector, we compute the mean value of the Y vector as $$\mu_y = \frac{\sum_i^{52} \{y_i\}}{52}$$

to be 39.1.

Step 5: Compute the variations of the values from their means and then, one by one, multiply the two variations, and finally sum their products.

$$\sum_{i=1}^{52} \{(x_i - \mu_x)(y_i - \mu_y)\} = 24{,}035$$

Step 6: Compute the sums of the squared variations of the values from their means, multiply the two sums, and then extract the square root of the product.

$$\sqrt{(\Sigma_i^{52}(x_i-\mu_x)^2)(\Sigma_i^{52}(y_i-\mu_y)^2)} = \sqrt{(22{,}689.58 \text{ times } 34{,}118.43)} = 27{,}823.24$$

Step 7: Compute the correlation coefficient which is the quotient of the values obtained in steps 5 and 6, i.e., $$CORREL(X,Y) = 24{,}035/27{,}823.24 = 0.8638$$

Step 8: "Normalize" the correlation coefficient by multiplying it by 100 to produce the TORQ for Abilities Importance for these two occupations.

$$NORMCORREL_{Importance}^{Abilities} = 100 \text{ times } 0.8638 = 86.38.$$

Comments on the example:
1. Often, during the application of TORQ to problem situations, the occupation represented by the X vector is taken to mean the occupation from which workers could be transitioned to the occupation represented by the Y vector. In case, the analysis would be that of examining the congruence of Cardiovascular Technologists and Technicians (SOC 29-2031.00) and Registered Nurses (29-1111.00) with the idea of advancing the former (whose values are represented by the X vector) into the latter (whose values are represented by the Y vector).
2. As standard TORQ procedure, a computation of the correlation coefficient identical to that described in the example is also carried using only a subset of the Standard Values. That subset uses only those pairs of values for which the Standardized Values of the Y vector is greater than zero. In such a computation for these two occupations, we have $$NORMCORREL_{Importance}^{Abilities} = 100 \text{ times } 0.8286 = 82.86.$$

3. The TORQ computations compute one (or more when the non-zero subsets of the Standard Values are used) matrix of normalized correlation coefficients for each O*NET descriptor listed in Table 1 for which data values (e.g., for Values or Importance) exist in the O*NET database. For O*NET12, therefore, there are 801 occupations and coefficients such as those produced in this example must be produced for each pair of occupations. That means that there are $801^2 = 646{,}601$ cells in each matrix. The computations as described in this example are sufficient to fill a single cell in such a matrix.
4. To properly reflect probable asymmetries between the transferability of workers between any pair of occupations, the following adjustments are made to the correlation coefficients for each O*NET descriptor or Combined Multiplicative Descriptor ("the descriptor"). Let the symbol "d" denote a specific descriptor.
   a. Denote the following:
      i. The "FROM" or "source" occupation is that from which it is proposed that one or more workers should be transferred.
      ii. The "TO" or "destination" occupation is that to which the aforementioned workers are to be transferred.
      iii. A equals the total number of attributes for the descriptor "d".
      iv. N equals the number of positive differences, i.e., the number of attributes of the given descriptor "d" for which the standardized O*NET score of the "TO" occupation exceeds the value of the same attribute for the "FROM" occupation.

v. $P^+$ the percent of differences that are positive, i.e., N/A expressed as a percent.

vi. NORMCORREL$^d$ equals the normalized simple correlation coefficient between the scores of the attributes in the FROM and TO occupations, computed for the descriptor as described above herein.

vii. $P^C$ equals the "Proximity Coefficient" which is the ratio of the sum of the scores of the "FROM" occupation to the sum of the scores of the "TO" occupation, but only for those attributes for which the score of the "TO" occupation exceeds that of the "FROM" occupation.

viii. $\Delta$ equals $1-P^C$, i.e., One minus the Proximity Coefficient.

ix. $\Omega$ equals $1-P^+$, i.e., One minus the percent of differences that are positive.

x. $\Gamma$ equals $\Delta^*\Omega$ which is the addition to be made to $P^C$.

xi. $^AP^C$ equals $P^C+\Gamma$ which is the Adjusted Proximity Coefficient.

xii. TORQ$^d$ equals (NORMCORREL$^d$+$^AP^C$) which is the TORQ score for descriptor d properly adjusted to reflect the asymmetry of the reciprocal measures of transferability of workers between the FROM occupation and the TO occupation.

Comments and Observations on Usage and Interpretation of TORQ

Certain abilities scores may be key limiting factors for the feasibility of occupational transfer. Some abilities, unlike most skills and knowledge, are simply inherent qualities that are not responsive to training, education, or other adjustments. Some jobs require certain abilities that constitute critical limiting factors. (The previous example of night vision for truck drivers is one such ability.) To generate a useful comparison between occupations, then, these limiting factors must be taken into account—in other words, these specific limiters must be observed along with the TORQ values in order to determine the utility of TORQ in assessing the feasibility of job transfer. (An individual accountant may have perfectly good night vision, rendering the comparison between the typical abilities of an accountant and a truck driver in this dimension irrelevant to the feasibility of his transition to become a truck driver.) A further dimension of the reporting systems associated with TORQ is in development to "flag" these limiting factors and screen them in a way that makes TORQ analysis more nuanced and more useful.

A related the point above—TORQ analysis generally yields the most useful results in job comparisons where relative skills and knowledge levels matter. Abilities, as already noted, tend to be less flexible for individuals than levels of skill and knowledge. (For example, doctors in general practice and those who perform surgery may have very closely comparable skills, knowledge, and even education levels. Some of the only vital distinguishing factors between these two may happen to be in the level and importance of manual dexterity required of a surgeon. Abilities TORQ analysis might therefore show that the feasibility of transfer between the general practitioner and the surgeon may be low, whereas an individual general practitioner may have all the manual dexterity she needs to facilitate a job change to surgeon. The same kind of comparison would hold true for two occupations in which skills and knowledge levels are comparably very low. Therefore, skills and knowledge TORQs are more useful to those seeking to assess training needs for job transfer, for reasons ranging from relocation of dislocated workers to recruitment of new job candidates from an existing labor pool.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification.

The invention claimed is:

1. A method for computing a correlation coefficient for a pair of occupations as an indication of transferability of workers between the occupations comprising:

providing a computer to perform computations;

selecting the pair of occupations;

for each occupation in a set of occupations:

entering into a matrix or database a set of scores for a selected individual worker attribute for an occupation, the set of scores for each attribute being one or more sets $S^k$ consisting of $N^k$ scores, where $S^k \ni x_j$ (j=1, 2, ... $N^k$);

computing, with the computer, a product of an importance score and a level score for the attribute to produce a composite attribute value;

entering the composite attribute value into the matrix;

accessing, with the computer, data in the matrix;

computing, with the computer, a correlation coefficient for the pair of occupations by correlating the composite attribute value for the pair of occupations by the following formula:

$$\text{Correl}(X, Y) = \frac{\sum_i^{N^k} \{(x_i - \mu_x)(y_i - \mu_y)\}}{\left[\sqrt{\sum_i^{N^k} (x_i - \mu_x)^2 \sum_i^{N^k} (y_i - \mu_y)^2}\right]}$$

wherein: X and Y represent two vectors in a set, $S^k$, of scores for the $x^{th}$ and $y^{th}$ occupations in a set of occupations; where both x and y run from 1 to N, where N is the number of occupations in the set of occupations and x and y are composite attribute values assigned to each occupation; k is a value indicating a level assigned to an individual worker attribute; $x_i^a X$; $y_i^a Y$; i=1, 2, ... $N^k$;

$$\mu_x = \frac{\sum_i^{N^k} \{x_i\}}{N^k}$$

is the mean value of the X vector and $$\mu_{xy} = \frac{\sum_i^{N^k} \{y_i\}}{N^k}$$

is the mean value of the Y vector;

normalizing the correlation coefficients on a scale of 1 to 100;

adjusting the normalized correlation coefficients by
producing a ratio whereof the numerator is calculated as the sum of the differences between the members of each pair of the composite level-importance scores for two selected occupations, the two selected occupations being a source occupation and a destination occupation, for which the composite level-importance scores for the destination occupation exceed the composite level-importance scores for the source occupation, and the denominator is calculated as the raw sum of the composite level-importance scores of the destination occupation; and
adjusting the correlation coefficients, with the computer, for each composite attribute by averaging it with the produced ratios; and
producing a report of the correlation coefficients for all pairs of occupations in the set to indicate transferability of workers, indicated by a value of the correlation coefficients, between the occupations.

2. The method of claim 1, wherein adjusting the normalized correlation coefficient by the formula $(w^1 * NORMCORREL^d + w^2 *{}^A P^C)/(w^1+w^2)$ wherein:
  i. the source occupation is that from which it is proposed that one or more workers should be transferred;
  ii. the destination occupation is that to which said workers are to be transferred;
  iii. A equals a total number of attributes for a descriptor "d";
  iv. N equals a number of positive differences, the number of attributes of the given descriptor "d" for which a standardized database score of the destination occupation exceeds a value of the same attribute for the source occupation;
  v. $P^+$ is a percent of differences that are positive, N/A expressed as a percent;
  vi. $NORMCORREL^d$ equals a normalized simple correlation coefficient between the scores of the attributes in the source and destination occupations, computed for the descriptor;
  vii. $P^C$ equals the "Proximity Coefficient" which is a ratio of a sum of the scores of the source occupation to a sum of the scores of the destination occupation, but only for those attributes for which the score of the destination occupation exceeds that of the source occupation;
  viii. $\Delta$ equals $1-P^C$, 1 minus the Proximity Coefficient;
  ix. $\Omega$ equals $1-P^+$, 1 minus the percent of differences that are positive;
  x. $\Gamma$ equals $\Delta * \Omega$ which is an addition to be made to $P^C$;
  xi. ${}^A P^C$ equals $P^C + \Gamma$ which is a Adjusted Proximity Coefficient;
  xii. $w^1$ equals a positive numerical weight assigned by a using analyst to $NORMCORREL^d$;
  xiii. $w^2$ equals a positive numerical weight assigned by the using analyst to ${}^A P^C$; and
  xiv. $w^1$ may but need not necessarily equal $w^2$.

* * * * *